United States Patent
Kobayashi et al.

(10) Patent No.: US 8,258,429 B2
(45) Date of Patent: Sep. 4, 2012

(54) LASER WORKING APPARATUS, AND LASER WORKING METHOD

(75) Inventors: Takashi Kobayashi, Tochigi-ken (JP);
Katsuyuki Nakajima, Utsunomiya (JP);
Hiroaki Yamagishi, Utsunomiya (JP);
Akihiro Nemoto, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 291 days.

(21) Appl. No.: 12/812,195

(22) PCT Filed: Jan. 16, 2009

(86) PCT No.: PCT/JP2009/050518
§ 371 (c)(1),
(2), (4) Date: Jul. 8, 2010

(87) PCT Pub. No.: WO2009/091020
PCT Pub. Date: Jul. 23, 2009

(65) Prior Publication Data
US 2010/0282727 A1 Nov. 11, 2010

(30) Foreign Application Priority Data

Jan. 17, 2008 (JP) ................................. 2008-008439
Feb. 1, 2008 (JP) ................................. 2008-022716

(51) Int. Cl.
*B23K 26/00* (2006.01)
(52) U.S. Cl. ............. 219/121.71; 219/121.6; 219/121.7; 219/121.72
(58) Field of Classification Search ................ 219/121.6, 219/121.61, 121.67, 121.68, 121.69, 121.7, 219/121.71, 121.72
See application file for complete search history.

(56) References Cited

U.S. PATENT DOCUMENTS

| 2005/0282407 A1* | 12/2005 | Bruland et al. ............... 438/795 |
| 2008/0094640 A1* | 4/2008 | Cordingley et al. ...... 219/121.72 |
| 2010/0032416 A1* | 2/2010 | Jeong et al. .............. 219/121.61 |

FOREIGN PATENT DOCUMENTS

| DE | 10054853 | 8/2002 |
| DE | 102004050047 | 4/2006 |
| EP | 0 299 143 | 1/1989 |
| JP | 02-147187 | 6/1990 |
| JP | 2623296 | 4/1997 |
| JP | 2001-150248 | 6/2001 |
| JP | 2001-212685 | 8/2001 |
| JP | 2003-260580 | 9/2003 |
| JP | 2005-211962 | 8/2005 |
| JP | 2007-237210 | 9/2007 |

* cited by examiner

*Primary Examiner* — Kevin M Picardat
(74) *Attorney, Agent, or Firm* — Rankin, Hill & Clark LLP

(57) ABSTRACT

A first laser working method includes a step of irradiating the metallic work held by a rotation holding mechanism, with a nanosecond laser beam from a first laser oscillation mechanism, to form a through hole, and a step of irradiating, when the metallic work is rotated under the action of the rotation holding mechanism, the inner wall of the through hole with a picosecond laser beam from a second laser oscillation mechanism, thereby to finish the same. While forming the through hole, metal vapor is sucked from the outside of the metallic work. Then, the gas is fed from the outside of the metallic work, and the inside of the metallic work is suctioned. In a second laser working method, when a lower hole made through is radially enlarged, the exit side of the lower hole is kept lower in pressure than the laser incident (or entrance) side.

7 Claims, 16 Drawing Sheets

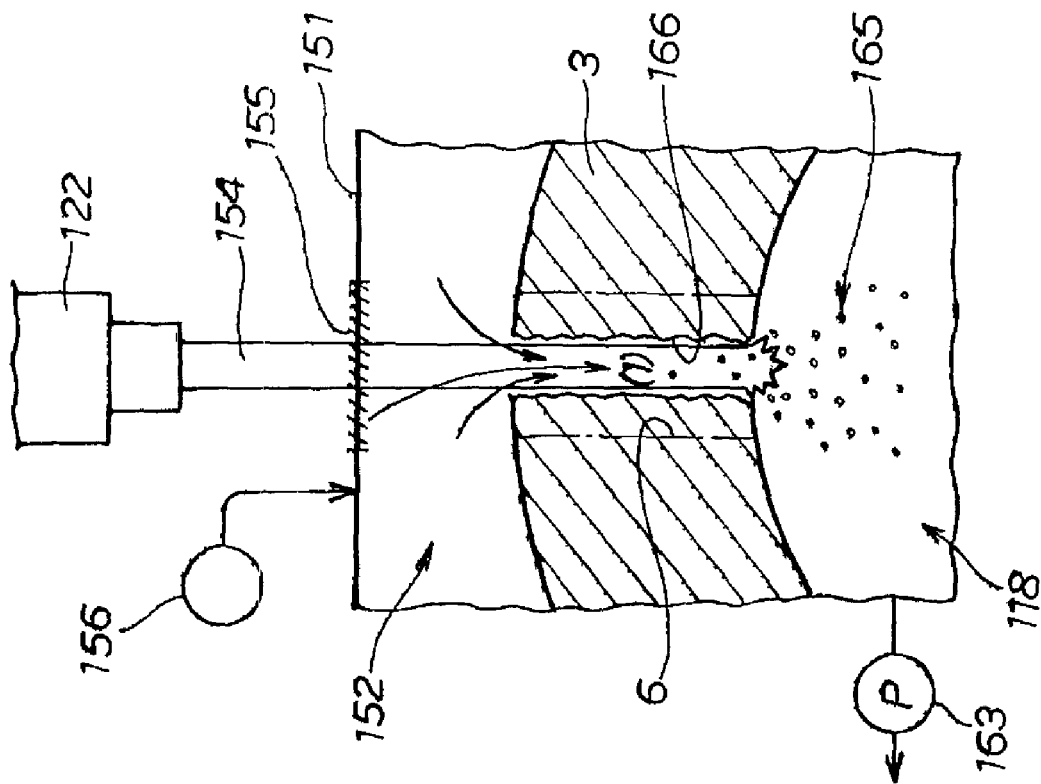
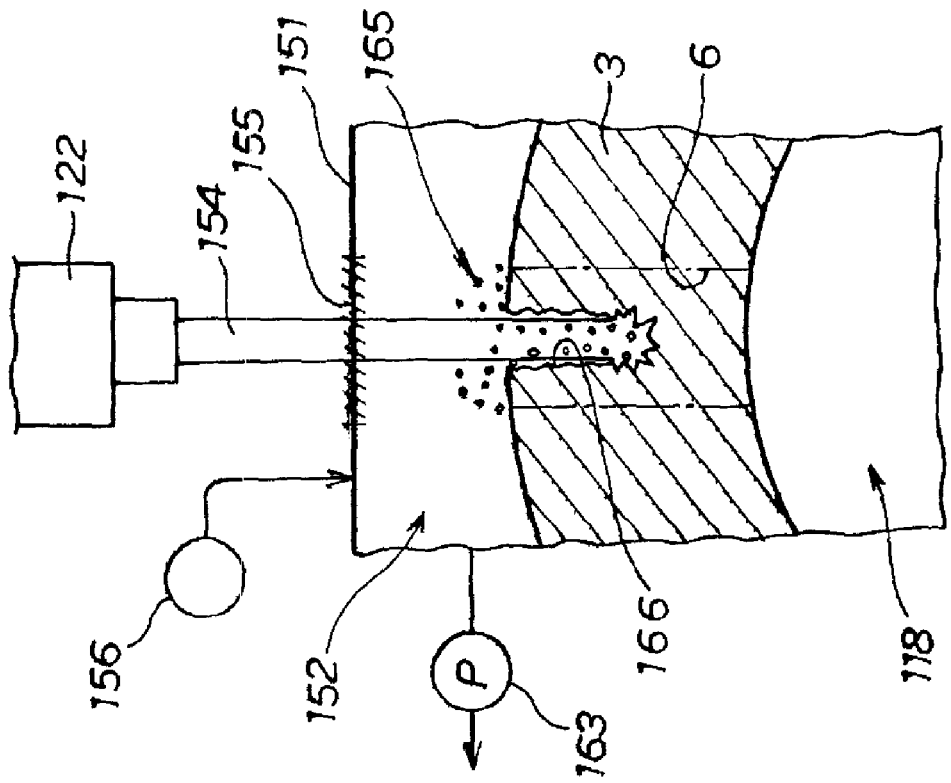

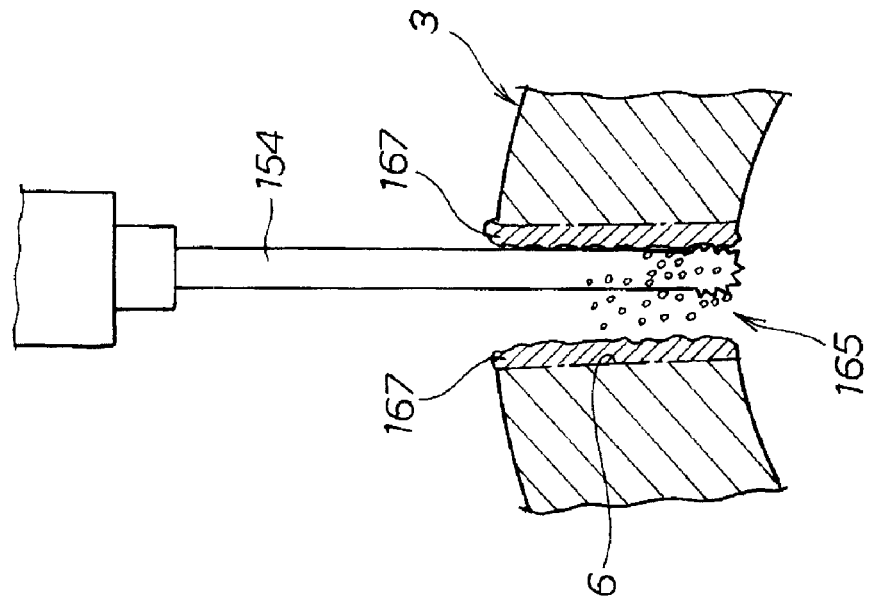
FIG. 10B (COMPARATIVE EXAMPLE)
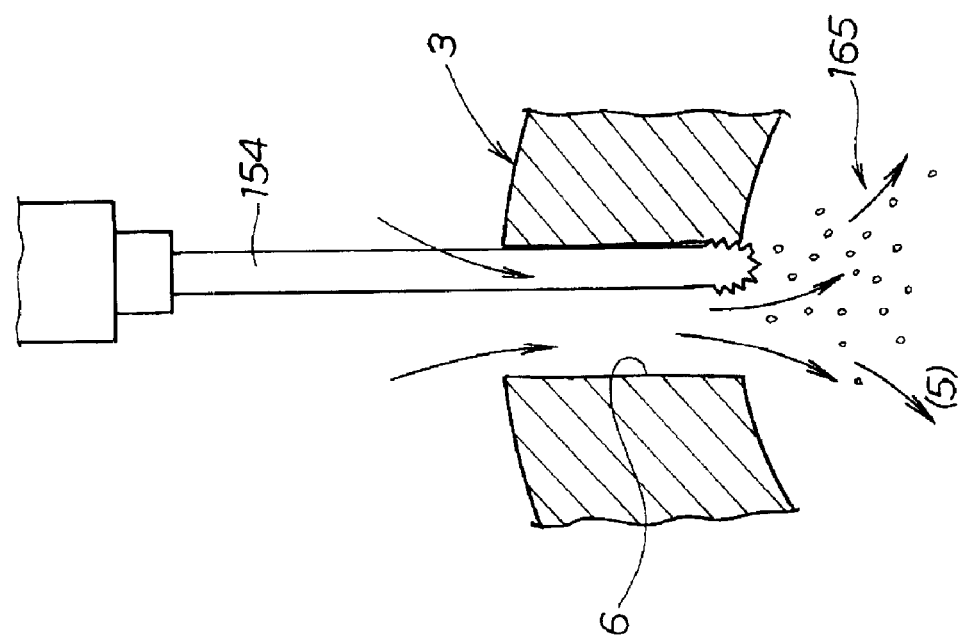
FIG. 10A (INVENTIVE EXAMPLE)

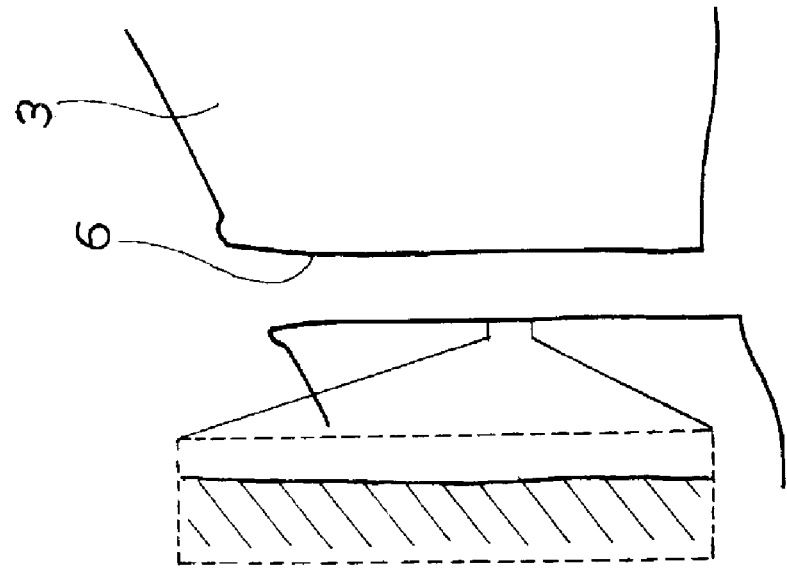
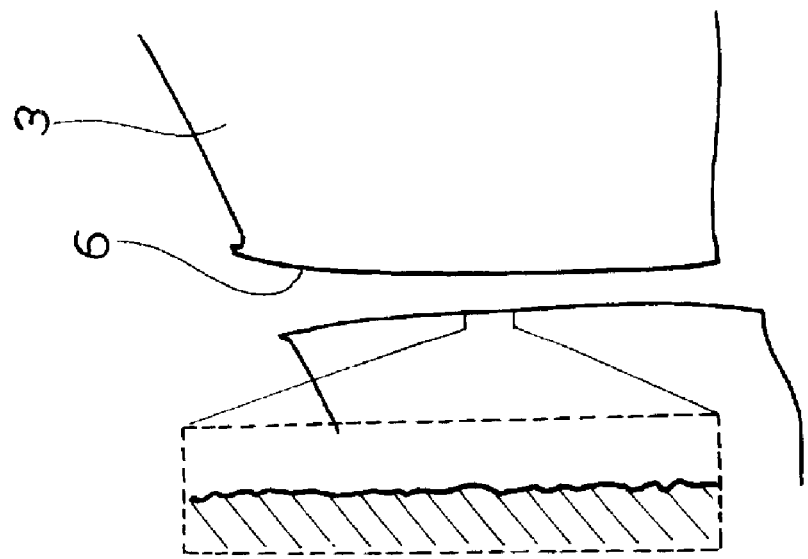

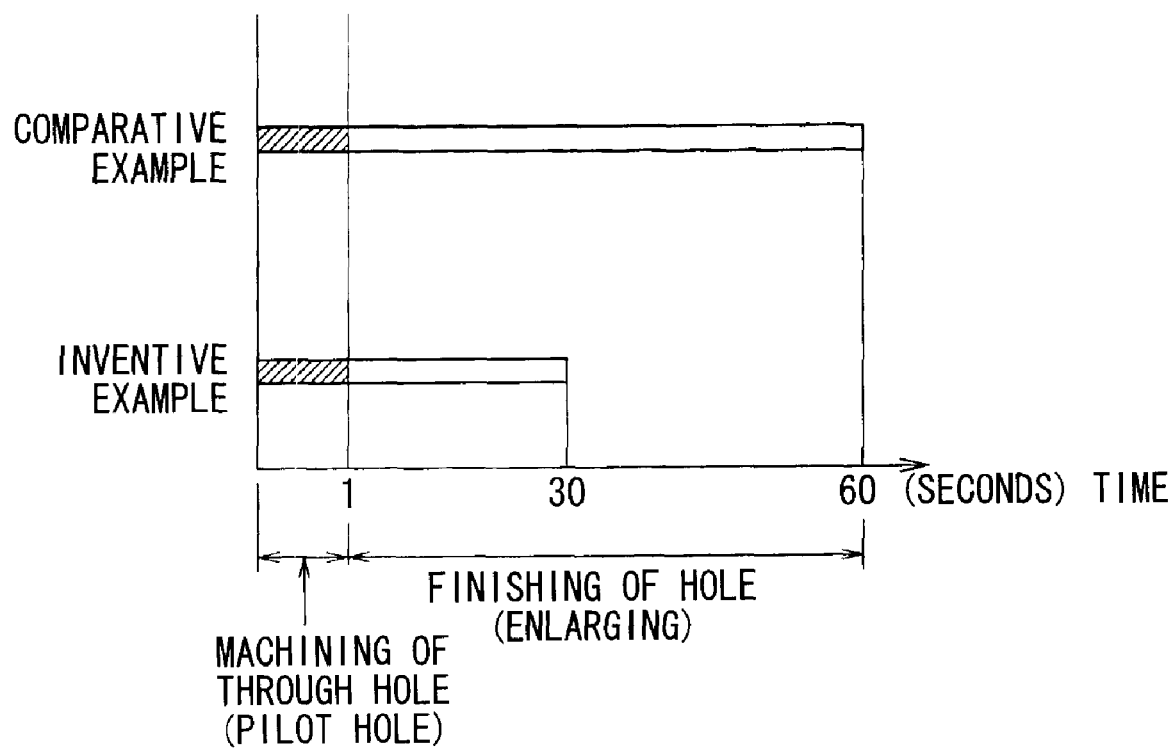

LASER WORKING APPARATUS, AND LASER WORKING METHOD

TECHNICAL FIELD

The present invention relates to a laser machining (working) apparatus and a laser machining (working) method for forming a through hole in a workpiece by applying a laser beam to the workpiece.

BACKGROUND ART

FIG. 13 is a schematic front elevational view of a fuel injection valve 1, in its entirety, for use on an automobile. The fuel injection valve 1 has a nozzle holder 2 and a fuel injection nozzle 3 of metal which is held on a tip end of the nozzle holder 2. The reference numeral 4 represents an inlet port for drawing in a fuel.

FIG. 14 is a schematic fragmentary vertical cross-sectional view of a tip end of the fuel injection nozzle 3. As shown in FIG. 14, the tip end of the fuel injection nozzle 3 is constructed as a hollow portion in which a nozzle needle 5 is inserted. When the nozzle needle 5 is displaced, the hollow portion of the fuel injection nozzle 3 is brought into or out of fluid communication with a plurality of injection holes 6 (only two are shown in FIG. 14) defined through the tip end of the fuel injection nozzle 3, opening or closing a fuel passage.

Recently, the injection holes 6 are formed as through holes, using a laser beam. In other words, a laser machining process is performed to form the injection holes 6.

The laser beam is applied to the tip end from outside the tip end. The laser beam melts the wall of the tip end from an outer wall surface thereof toward an inner wall surface thereof. Finally, the inner wall surface is melted to form an injection hole 6. A laser machining apparatus which applies a laser beam for such a machining process is disclosed in Japanese Patent No. 2623296, for example.

When the above laser machining process is performed, the laser beam which is focused may not be of a truly circular cross-sectional shape, tending to result in a reduction in the accuracy of the diameter and roundness of the injection holes. For the purpose of eliminating the above drawback and increasing the machining accuracy, Japanese Laid-Open Patent Publication No. 2001-150248 proposes an electric discharge process for finishing a small hole formed by a laser machining process, and Japanese Laid-Open Patent Publication No. 2001-212685 proposes a process of machining a workpiece by applying an ultrashort-pulse laser beam such as a femtosecond laser beam or the like after the workpiece has been preheated by a first laser beam.

The prior art disclosed in Japanese Laid-Open Patent Publication No. 2001-150248 will briefly be described below with reference to FIGS. 15 and 16.

First, as shown in FIG. 15, a laser machining head 101 is moved to a position directly above a hole machining position on a workpiece 102. The laser machining head 101 applies a laser beam 103 to form a pilot hole 104 through the workpiece 102.

Then, as shown in FIG. 16, an electric discharge machining head 105 is guided along a moving base 107 to a position directly above the pilot hole 104. Then, an electrode 106 is lowered and performs an electric discharge machining process to enlarge the pilot hole 104 into a through hole having a predetermined diameter.

DISCLOSURE OF INVENTION

As described in the above prior art, the laser beam is applied to the stationary workpiece in the laser machining process. Since the laser beam has a high energy density, however, the region of the workpiece where the through hole is formed is likely to develop a thermally altered layer. Such a thermally altered layer is also one of factors which make it difficult to increase the machining accuracy.

When the laser beam is applied to the workpiece, a plume (which is a mixed gas including a metal vapor from the workpiece and a vapor produced when the metal vapor is ionized) is emitted as the workpiece is melted and evaporated. It has been pointed out that the plume, particularly the metal vapor, blocks the laser beam and hence makes it hard for the boring process using the laser beam to make progress.

The prior art disclosed in Japanese Laid-Open Patent Publication No. 2001-150248 is also disadvantageous in that after the step of forming the pilot hole through the workpiece, the moving base 107 replaces the laser machining head 101 with the electric discharge machining head 105, resulting in a time-consuming process and an increased number of working steps. Therefore, it is not easy to increase the production efficiency. It has been desirous to reduce the number of working steps for the purpose of increasing the productivity.

It is a general object of the present invention to provide a laser machining apparatus which makes a workpiece less liable to develop a thermally altered layer and hence makes it easy to increase the machining accuracy.

A major object of the present invention is to provide a laser machining apparatus which prevents a metal vapor from blocking a laser beam for thereby allowing a boring process to make progress efficiently.

Another object of the present invention is to provide a laser machining method which makes a workpiece less liable to develop a thermally altered layer.

Still another object of the present invention is to provide a laser machining method which allows a boring process to make progress efficiently.

Yet another object of the present invention is to provide a laser machining method which makes it possible to reduce the number of working steps.

According to an embodiment of the present invention, there is provided a laser machining apparatus for forming a through hole in a closed region of a hollow workpiece of metal by applying at least either one of a nanosecond laser beam and a picosecond laser beam thereto, comprising:

a laser machining head having a first laser oscillating mechanism for applying the nanosecond laser beam and a second laser oscillating mechanism for applying the picosecond laser beam;

a rotating and holding mechanism for holding the workpiece of metal and rotating the workpiece of metal about the region thereof to which at least either one of the nanosecond laser beam and the picosecond laser beam is applied;

a vapor removing mechanism for drawing a metal vapor which is produced from the workpiece of metal when the through hole is formed therein; and control means for controlling activation and inactivation of the laser machining head, the rotating and holding mechanism, and the vapor removing mechanism.

With the above arrangement, it is possible to finish the workpiece of metal while the workpiece of metal is rotating. Specifically, for example, since a laser beam can be applied to the workpiece of metal which is rotating while it is being finished, the workpiece of metal is easily prevented from developing a thermally altered layer.

When the laser beam is applied to the workpiece of metal to finish the same while the workpiece of metal is rotating, a through hole having a substantially truly circular shape can be formed even if the laser beam that is converged has a noncircular cross-sectional shape.

According to the present invention, therefore, it is easy to obtain a highly accurate through hole.

The laser machining apparatus has a suction mechanism for drawing the metal vapor when the workpiece of metal is laser-machined. Therefore, the produced metal vapor can quickly be removed under suction. As the metal vapor is prevented from staying stagnant, the laser beam can easily reach a location to be machined. A laser machining process can thus make progress efficiently.

Preferably, the vapor removing mechanism has suction means for drawing the metal vapor from inside the workpiece of metal. At this time, a negative pressure is generated which is higher than when the metal vapor is drawn from outside the workpiece of metal. Consequently, even if the metal vapor is produced in a large quantity, it can easily be removed under suction by the suction mechanism. Stated otherwise, the metal vapor can quickly be removed.

Preferably, the vapor removing mechanism has gas supply means for supplying a gas after the through hole is formed. Since the metal vapor can easily be delivered under pressure by the gas, it is much easier to prevent the metal vapor from staying stagnant.

According to another embodiment of the present invention, there is provided a laser machining method for forming a through hole in a closed region of a hollow workpiece of metal by applying at least either one of a nanosecond laser beam and a picosecond laser beam thereto, comprising the steps of:

forming the through hole by applying the nanosecond laser beam from a first laser oscillating mechanism to the workpiece of metal which is held by a rotating and holding mechanism; and after rotating the workpiece of metal by the rotating and holding mechanism, finishing the through hole by applying the picosecond laser beam from a second laser oscillating mechanism to an inner wall of the through hole in the workpiece of metal which is being rotated by the rotating and holding mechanism;

wherein a metal vapor is drawn from outside the workpiece of metal during the step of forming the through hole; and a gas is supplied from outside the workpiece of metal and drawn from inside the workpiece of metal, after the step of forming the through hole.

By carrying out the above steps, it is possible to form an accurate through hole efficiently.

According to the present invention, as described above, since it is possible to perform a laser machining process on the workpiece of metal while the workpiece of metal is rotating, the workpiece of metal is prevented from developing a thermally altered layer. In addition, since it is possible to change the position where the laser beam is applied to the workpiece of metal, it is possible to form a through hole which is of a truly circular shape or a circular shape that is close to a truly circular shape. Stated otherwise, it is possible to form an accurate through hole easily.

Furthermore, as the metal vapor that is produced when the workpiece of metal is laser-machined is removed under suction, the laser beam is allowed to reach the machined position easily. Therefore, a laser machining process can thus make progress efficiently.

According to still another embodiment of the present invention, there is provided a laser machining method for forming a through hole in a workpiece, comprising the steps of:

applying a laser beam to the workpiece to form a pilot hole therethrough; and enlarging the pilot hole with the laser beam while keeping a pressure on a laser exit side of the pilot hole lower than a pressure on a laser entrance side of the pilot hole.

In summary, the pilot hole is formed through the workpiece by the laser beam, and then the pilot hole is enlarged by the laser beam. Since the step of forming the pilot hole through the workpiece and the step of enlarging the pilot hole are carried out by the laser beam, it is not necessary to replace machining tools as with the prior art disclosed in Japanese Laid-Open Patent Publication No. 2001-150248. Inasmuch as no machining tools are replaced, the number of working steps required to form the through hole is reduced.

In addition, the pressure on the laser beam exist side (the outlet side) of the pilot holt is made lower than the pressure on the laser beam entrance side (the inlet side) of the pilot hole, thereby developing a pressure difference between the inlet side and the outlet side. The pressure difference is effective to generate an air stream from the inlet side to the outlet side of the pilot hole. The air stream can efficiently discharge a plume which is generated when the pilot hole is enlarged by the laser beam. As a result, the number of working steps required to form the through hole is reduced.

For making the pressure on the outlet side (the laser beam exist side) of the pilot holt lower than the pressure on the inlet side (the laser beam entrance side) of the pilot hole, the pressure on the inlet side may be made higher than the atmospheric pressure and the pressure on the outlet side may be made lower than the atmospheric pressure.

Preferably, an optical axis of the laser beam is rotated about an axis of the pilot hole in the step of enlarging the pilot hole with the laser beam. Therefore, the area in which the laser beam is applied to the workpiece per unit time is increased. Consequently, since the machined volume per unit time is increased, the man-hours required for the machining process to form the through hole are reduced.

BRIEF DESCRIPTION OF DRAWINGS

FIGS. 7A and 7B are flow diagrams illustrative of a process of forming a pilot hole through a fuel injection nozzle;

FIGS. 10A and 10B are schematic views showing how a laser machining process according to the second embodiment works;

FIGS. 11A and 11B are cross-sectional views of a machined hole, showing how an air stream affects the machining process;

FIG. 12 is a diagram showing different machining times depending on whether there is a pressure difference or not;

BEST MODE FOR CARRYING OUT THE INVENTION

Preferred embodiments of laser machining methods according to the present invention in relation to laser machining apparatus for carrying the laser machining methods will be described in detail below with reference to the accompanying drawings.

Figure 1:
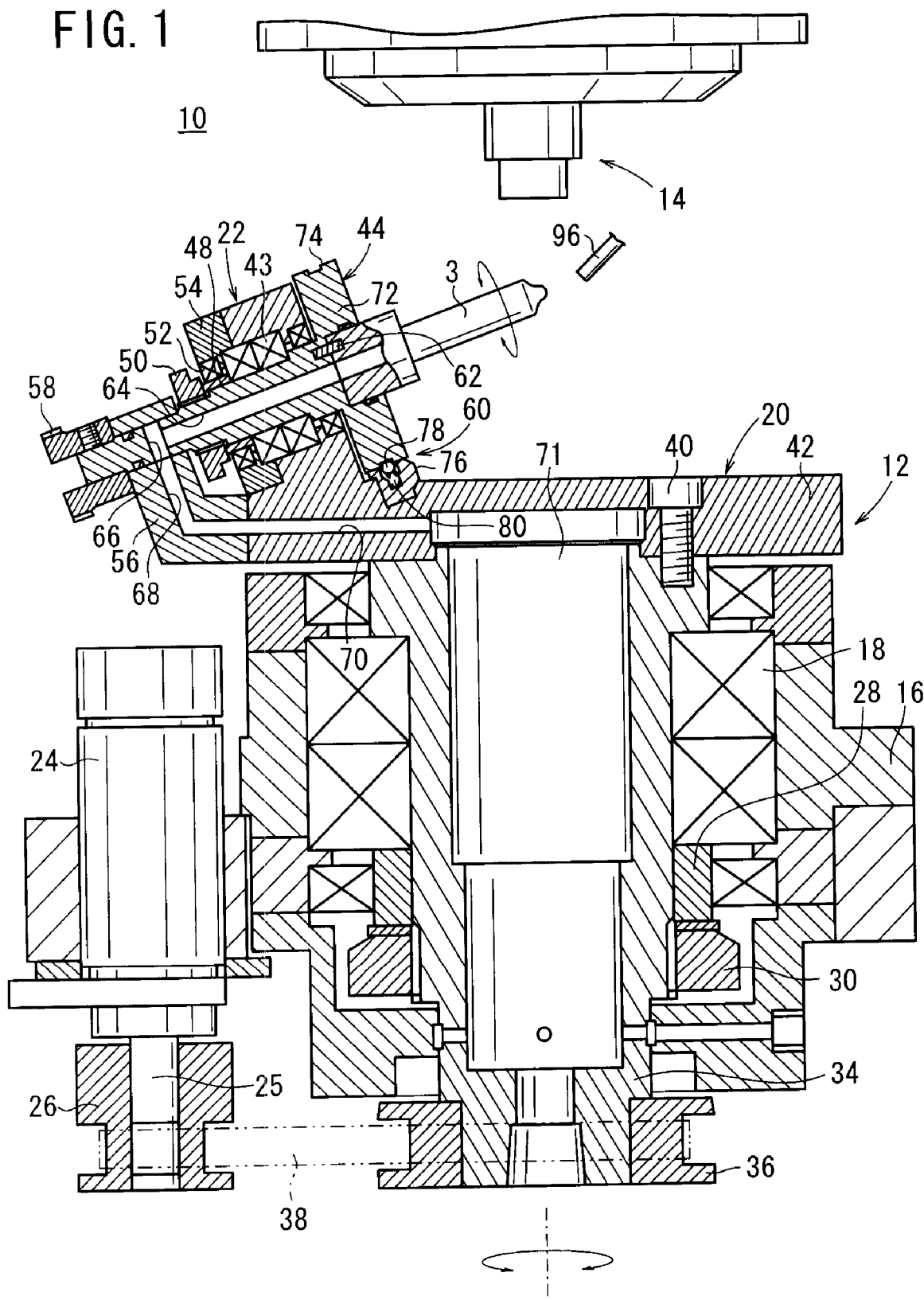
FIG. 1 is a fragmentary vertical cross-sectional view of a laser machining apparatus according to a first embodiment of the present invention.

FIG. 1 is a fragmentary vertical cross-sectional view of a laser machining apparatus 10 according to a first embodiment of the present invention. The laser machining apparatus 10 has a rotating and holding mechanism 12 for holding a fuel injection nozzle 3 (workpiece of metal), a laser machining head 14 for applying a laser beam, to be described later, to the fuel injection nozzle 3, and a vapor removing mechanism, to be described later, for drawing a metal vapor which is produced from the fuel injection nozzle 3 while an injection hole 6 is being formed.

The rotating and holding mechanism 12 has a base 16, a rotor 20 rotatably supported on the base 16 by bearings 18, and a workpiece holder 22 mounted on an upper portion of the rotor 20. A rotating motor 24 is combined with the base 16 and has a rotational shaft 25 with a drive pulley 26 fitted thereover.

The rotor 20 includes a rotational tubular member 34 mounted on the bearings 18 by a collar 28 and a nut 30. The rotational tubular member 34 has a small-diameter distal tubular end with a driven pulley 36 fitted thereover. A belt 38 is trained around the driven pulley 36 and the drive pulley 26.

The workpiece holder 22 comprises a holder base 42 coupled to the rotational tubular member 34 by a retaining shaft 40, a workpiece holding body 44 having a substantially T-shaped cross section which is rotatably mounted on the holder base 42 by bearings 43, a collar 48 and a nut 50 for retaining the workpiece holding body 44 against dislodgment from the bearings 43, an annular member 54 coupled to the holder base 42 for supporting a seal member 52, an extension 56 extending from the holder base 42 to an end of the workpiece holding body 44 for supporting an end of the workpiece holding body 44, a driven gear 58 mounted on the end of the workpiece holding body 44 for receiving drive power from an actuator (not shown) for rotating the workpiece holding body 44, and a workpiece indexing mechanism 60 for positioning the workpiece holding body 44 at each of predetermined angles. The reference numeral 62 denotes a positioning pin which serves to prevent the fuel injection nozzle 3 from rotating when the workpiece holding body 44 supports the fuel injection nozzle 3.

The workpiece holding body 44 has defined therein a first passage 64 communicating with the interior of the fuel injection nozzle 3 and a second passage 66 extending perpendicularly to the first passage 64. The second passage 66 communicates with a third passage 68 which is defined in the extension 56. The third passage 68 in turn communicates with a space 71 in the rotational tubular member 34 through a fourth passage 70 which is defined in the holder base 42.

The workpiece indexing mechanism 60 has a plurality of recesses 74 defined in an outer circumferential surface of a large-diameter portion 72 of the workpiece holding body 44 and spaced at given angular intervals along the circumferential direction, a case 76 mounted on the holder base 42 in confronting relation to the outer circumferential surface of the large-diameter portion 72, a ball 78 disposed in the case 76 for fitting engagement with one at a time of the recesses 74, and a helical spring 80 for resiliently urging the ball 78 toward one at a time of the recesses 74.

A counterweight means (not shown), whose weight corresponds to the weight of the workpiece holding body 44 and the fuel injection nozzle 3, for allowing the holder base 42 to rotate smoothly is disposed on a side surface of the holder base 42 of the workpiece holder 22 which faces the workpiece holding body 44. The counterweight means may comprise a weight corresponding to the weight of the workpiece holding body 44 and the fuel injection nozzle 3, for example. Alternatively, a tank for holding a liquid may be disposed in the holder base 42, and a sensor, not shown, mounted on the base 16 may monitor oscillations of the rotational tubular member 34. A control circuit 98 (see FIG. 2) for receiving a signal generated by the sensor depending on the degree of oscillation may issue a command to supply a liquid such as water or the like to the tank in order to reduce the oscillation of the rotational tubular member 34. In this case, the liquid (water or the like) may be supplied depending on the weight of the workpiece holding body 44 and the fuel injection nozzle 3, counterbalancing the weight. At any rate, the weight of the counterweight means is changed depending on the weight of the fuel injection nozzle 3 to be machined.

The distance by which adjacent two of the recesses 74 are spaced from each other corresponds to the distance by which adjacent two of injection holes 6 of the fuel injection nozzle 3 are spaced from each other.

Figure 2:
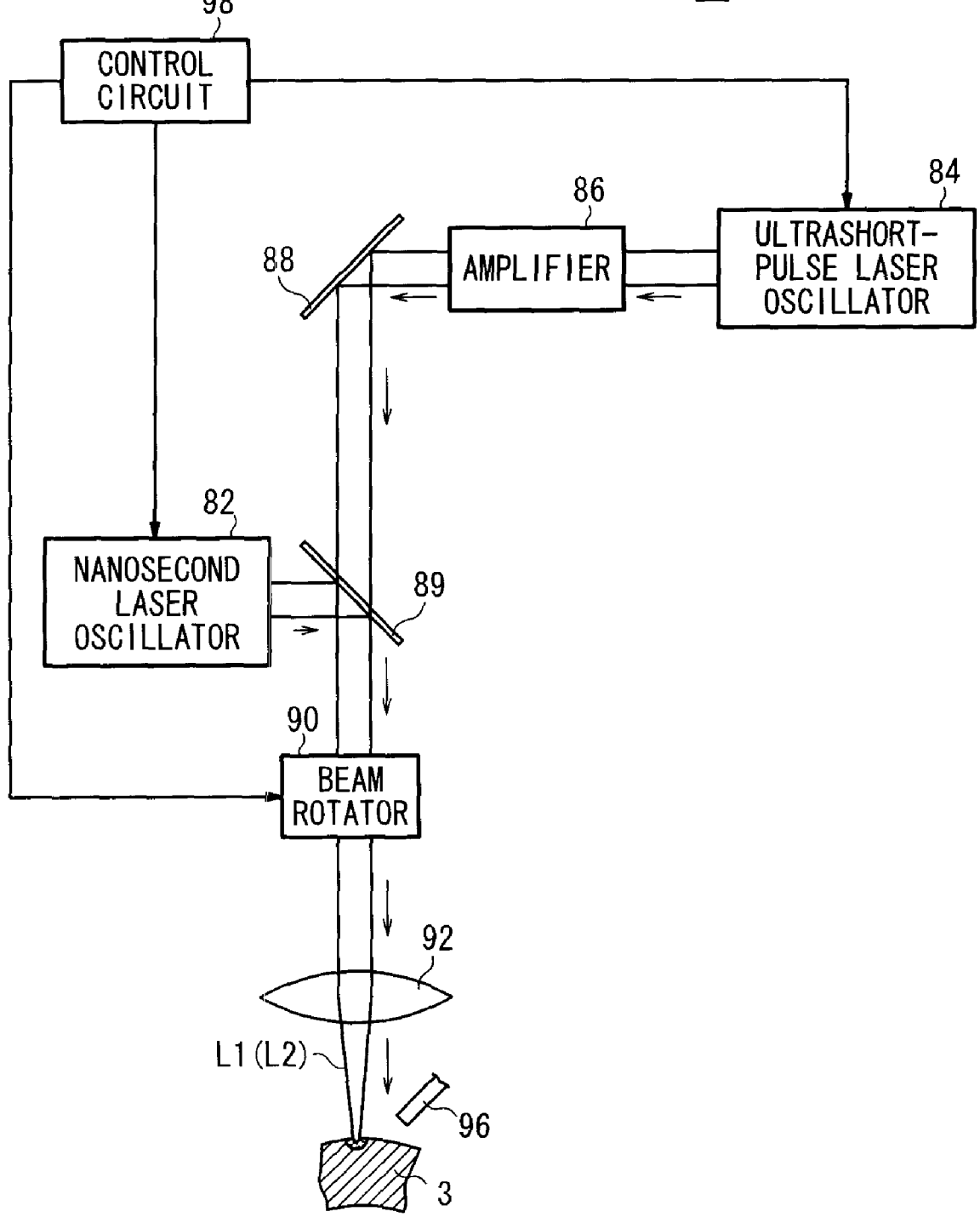
FIG. 2 is a schematic circuit diagram of a laser machining head of the laser machining apparatus shown in FIG. 1.

As shown in FIG. 2, the laser machining head 14 has a nanosecond laser oscillator 82 for emitting a nanosecond laser beam L1 and an ultrashort-pulse laser oscillator 84 (picosecond laser oscillator) for emitting a picosecond laser beam L2. The laser machining head 14 also has an amplifier 86 for amplifying the picosecond laser beam L2 emitted from the ultrashort-pulse laser oscillator 84, a mirror 88 for reflecting the picosecond laser beam L2 output from the amplifier 86, a mirror 89 for reflecting the nanosecond laser beam L1 emitted from the nanosecond laser oscillator 82, a beam rotator 90 for changing the focused positions of the nanosecond laser beam L1 and the picosecond laser beam L2, and a condenser lens 92 for converging the nanosecond laser beam L1 and the picosecond laser beam L2 onto the fuel injection nozzle 3.

The vapor removing mechanism has a suction mechanism, not shown, for drawing in from the space 71 in the rotational tubular member 34 through a suction nozzle 94 (see FIG. 5) inserted in the fuel injection nozzle 3, and a suction and supply mechanism including a suction and supply nozzle 96 (see FIGS. 1 and 2) disposed outside and near the fuel injection nozzle 3.

The rotating motor 24, the nanosecond laser oscillator 82, the ultrashort-pulse laser oscillator 84, the beam rotator 90, the suction mechanism, the suction and supply mechanism, and the actuator are electrically connected to the control circuit 98 (see FIG. 2).

A laser machining method according to the first embodiment is carried out by the laser machining apparatus 10 thus constructed, as follows:

First, in the state shown in FIG. 1, the rotating motor 24 is not energized, and the laser machining head 14 emits the nanosecond laser beam L1. Specifically, the control device energizes the nanosecond laser oscillator 82 to emit the nanosecond laser beam L1, which is applied by the beam rotator 90 and the condenser lens 92 to a given position on the fuel injection nozzle 3. At the same time, the suction and supply mechanism is actuated.

Figure 3:
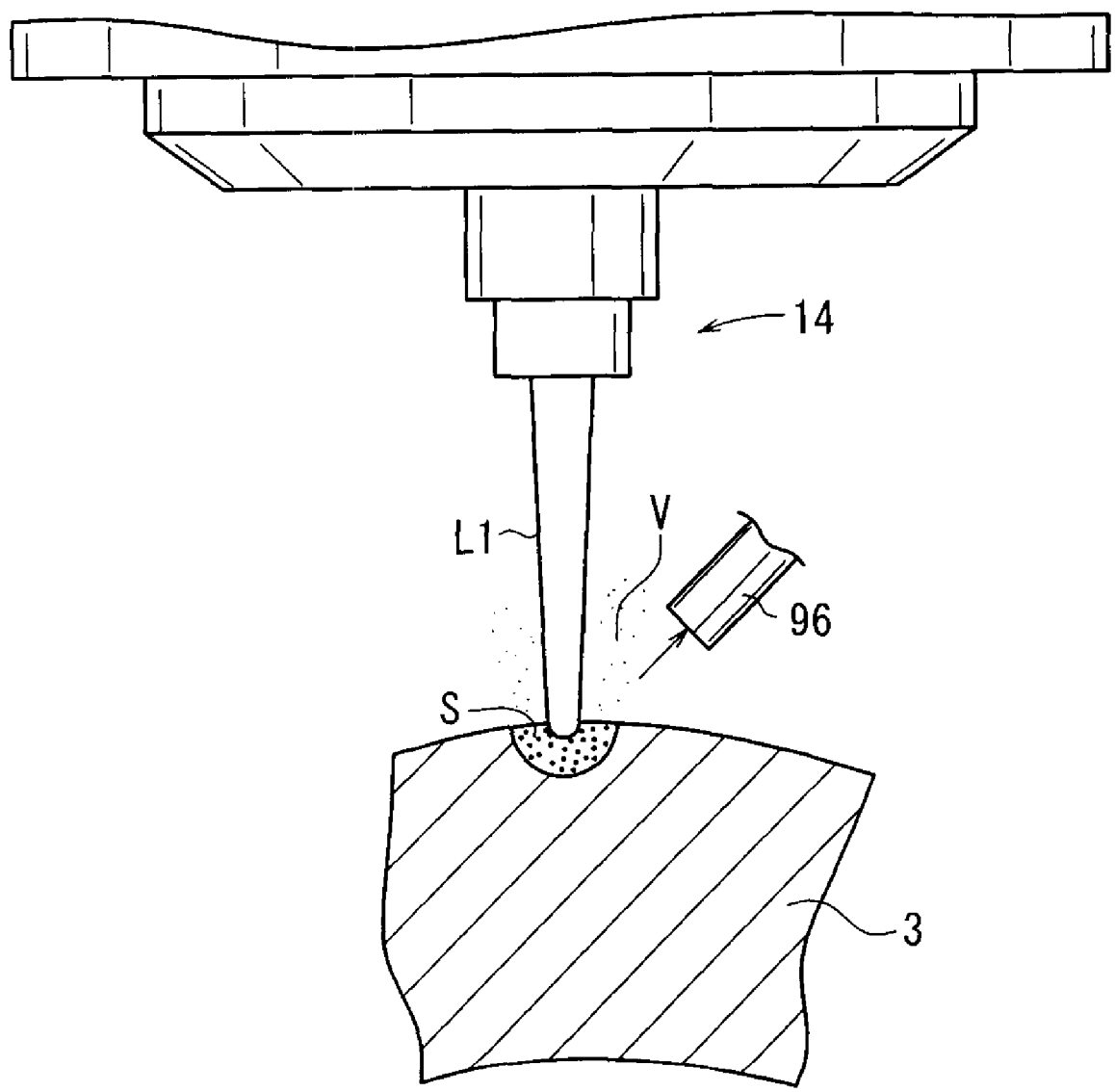
FIG. 3 is a fragmentary cross-sectional view showing the manner in which a nanosecond laser beam is applied to a fuel injection nozzle to form an injection hole therein.

When the nanosecond laser beam L1 is applied to the fuel injection nozzle 3, the fuel injection nozzle 3 is melted from its outer wall, producing a melted region S, as shown in FIG. 3. At this time, the melted region S produces a plume V including a large amount of metal vapor. If the plume V blocks the nanosecond laser beam L1, then it will impair the progress of the boring process (laser machining process). According to the first embodiment, however, the plume V is quickly drawn by the suction and supply nozzle 96. Therefore, the nanosecond laser beam L1 can easily reach the given location on the fuel injection nozzle 3, allowing the laser machining process to make progress efficiently.

The region of the fuel injection nozzle 3 which is irradiated with the nanosecond laser beam L1 melts up to the inner wall of the fuel injection nozzle 3 which faces the hollow therein. In this manner, a through hole is formed as an injection hole 6.

The control circuit 98 de-energizes the nanosecond laser oscillator 82, and thereafter issues a command signal to energize the rotating motor 24. In response to the command signal, the rotating motor 24 rotates its rotational shaft 25. The rotational shaft 25 rotates the drive pulley 26, causing the belt 38 to rotate the driven pulley 36 to start rotating the rotational tubular member 34.

Figure 4:
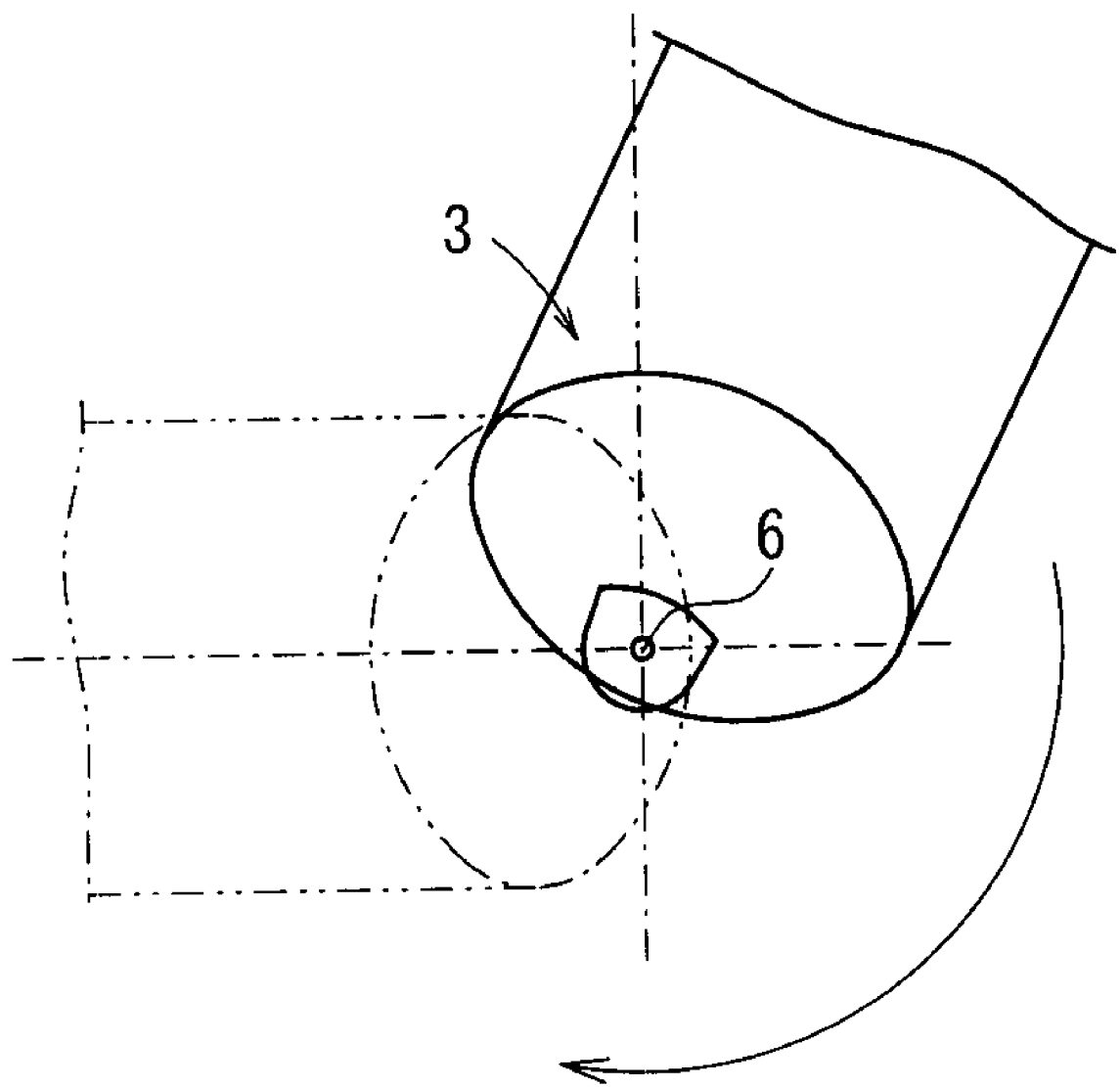
FIG. 4 is a fragmentary plan view showing the manner in which the fuel injection nozzle with the injection hole defined therein is rotated about the injection hole.

When the rotational tubular member 34 is rotated, the holder base 42 that is coupled to the rotational tubular member 34 by the retaining shaft 40 is rotated. As a result, as shown in FIG. 4, the fuel injection nozzle 3 is rotated about the injection hole 6.

Then, the control circuit 98 energizes the ultrashort-pulse laser oscillator 84 to emit the picosecond laser beam L2, which is applied by the beam rotator 90 and the condenser lens 92 to a position near the opening of the injection hole 6. At the same time, the suction and supply mechanism and the suction mechanism are actuated. The suction and supply nozzle 96 which is positioned outside the fuel injection nozzle 3 supplies a compressed gas, whereas the suction mechanism draws in via the suction nozzle 94 that is inserted in the fuel injection nozzle 3.

Figure 5:
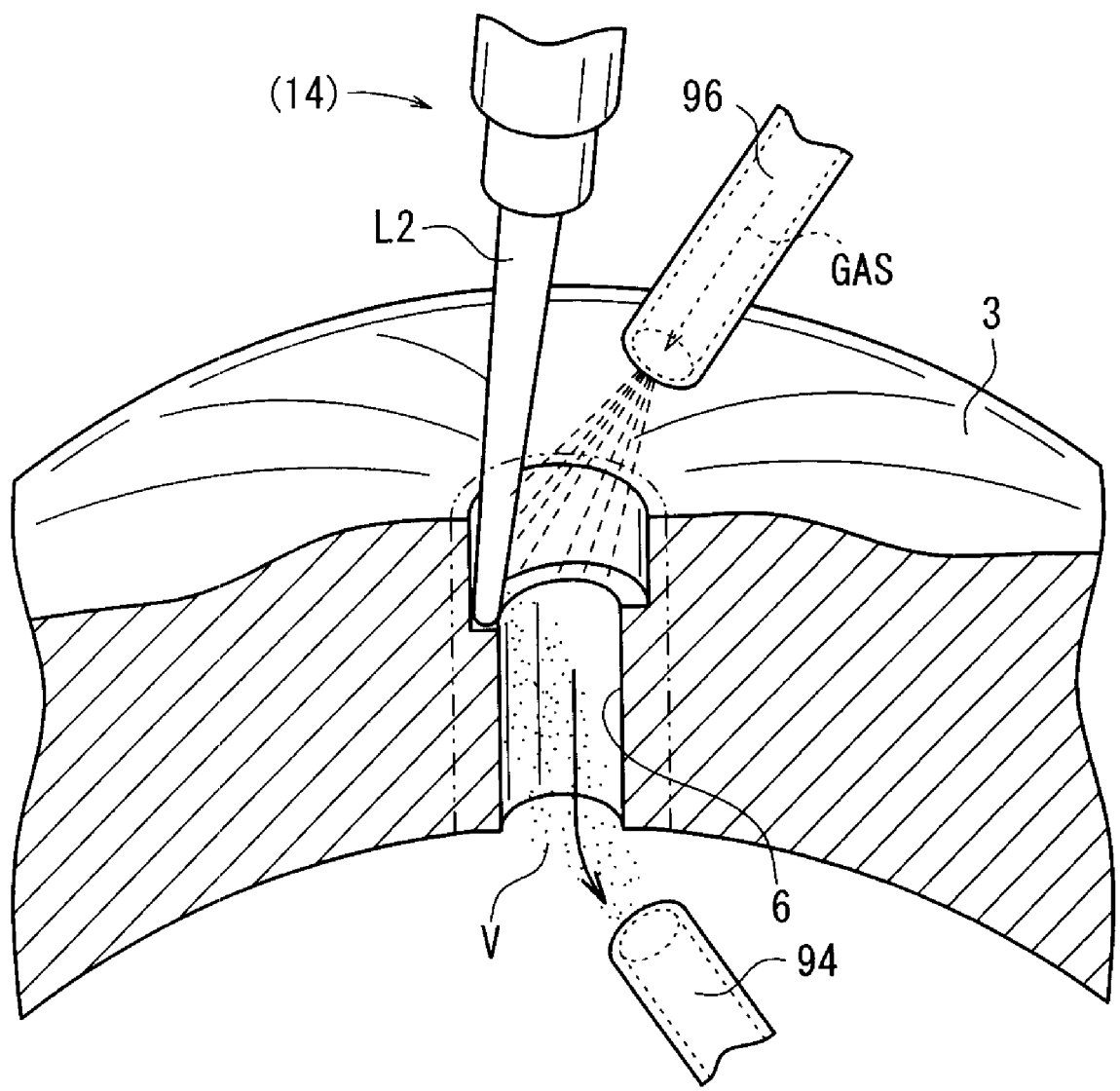
FIG. 5 is a fragmentary sectional perspective view showing the manner in which a picosecond laser beam is applied to an inner circumferential wall of the injection hole to finish the injection hole.

Since the fuel injection nozzle 3 is rotated, the picosecond laser beam L2 progresses while being slightly inclined to the axis of the injection hole 6, as shown in FIG. 5. The picosecond laser beam L2 melts the inner circumferential wall of the injection hole 6, finishing the injection hole 6 to a predetermined diameter and also finishing the inner circumferential wall thereof to a predetermined surface roughness. The injection hole 6 is thus finished.

At this time, the plume V which is produced when the inner circumferential wall is melted is quickly delivered under pressure into the fuel injection nozzle 3 by the compressed gas that is discharged via the suction and supply nozzle 96. As described above, the suction nozzle 94 is disposed in the fuel injection nozzle 3, and the suction mechanism performs its suction process via the suction nozzle 94. Therefore, the plume V is quickly drawn by the suction mechanism.

While the fuel injection nozzle 3 is rotating, the plume V tends to stay stagnant in layers within the injection hole 6. According to the first embodiment, however, as described above, the plume V is delivered under pressure from outside the fuel injection nozzle 3 into the fuel injection nozzle 3, and is drawn from inside the fuel injection nozzle 3. When the plume V is drawn from inside the fuel injection nozzle 3, a negative pressure is generated which is higher than when the plume V is drawn from outside the fuel injection nozzle 3. Consequently, even if the plume V is produced in a large quantity, it can easily be removed under suction.

For the reasons described above, the plume V can quickly be removed. The picosecond laser beam L2 can thus easily reach the inner circumferential wall, so that the laser machining process on the inner circumferential wall makes progress efficiently.

Since the picosecond laser beam L2 is applied to the fuel injection nozzle 3 while the fuel injection nozzle 3 is being rotated, the picosecond laser beam L2 reaches the inner circumferential wall of the injection hole 6 at all times. Therefore, even if the picosecond laser beam L2 has a noncircular cross-sectional shape, it is possible to produce the injection hole 6 which is substantially truly circular in shape.

In addition, as the fuel injection nozzle 3 is rotated, it is less liable to develop a thermally altered layer even when the picosecond laser beam L2 that is applied is of a high energy density. Consequently, the machining accuracy is also increased.

According to the first embodiment in which the fuel injection nozzle 3 is rotated, therefore, it is possible to form the injection hole 6 which is of a truly circular shape or a circular shape that is close to a truly circular shape. Stated otherwise, the first embodiment is advantageous in that: it is possible to form the injection hole 6 accurately.

After one injection hole 6 is formed, the control circuit 98 issues a command signal for rotating the fuel injection nozzle 3 by a predetermined angle. In response to the signal, the actuator causes the driven gear 58 to rotate the workpiece holding body 44 to rotate the fuel injection nozzle 3 by the predetermined angle. Finally, the ball 78 fits into one of the recesses 74 of the workpiece indexing mechanism 60, thereby positioning the fuel injection nozzle 3. The boring process is performed on the positioned tip end in the same manner as described above to form a new injection hole 6. When a given number of injection holes 6 are formed, all the boring process is finished.

In the first embodiment, the fuel injection nozzle 3 is illustrated as a hollow workpiece of metal. However, a hollow workpiece of metal is not limited to the fuel injection nozzle 3.

Furthermore, the suction and supply mechanism may perform only a suction function, to draw the plume V from both outside and inside of the hollow workpiece of metal (e.g., the fuel injection nozzle 3).

A second embodiment of the present invention will be described below.

Figure 6:
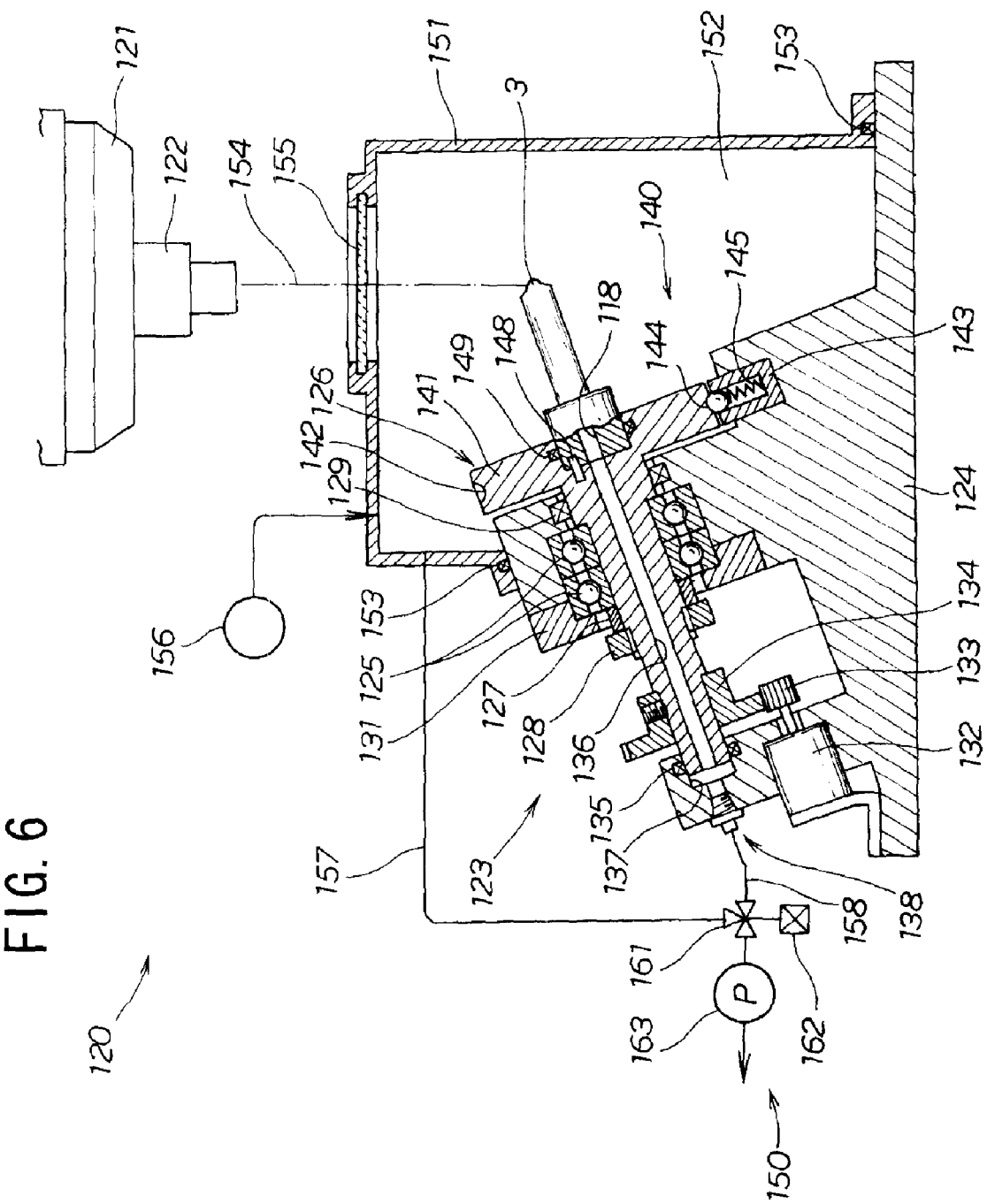
FIG. 6 is a fragmentary vertical cross-sectional view of a laser machining apparatus for carrying out a laser machining method according to a second embodiment of the present invention.

FIG. 6 is a fragmentary vertical cross-sectional view of a laser machining apparatus 120 for carrying out a laser machining method according to a second embodiment of the present invention. The laser machining apparatus 120 has a laser oscillator 121, a machining head 122 for emitting a laser beam, which is disposed below the laser oscillator 121, and a workpiece holder 123 disposed below the machining head 122.

The workpiece holder 123 comprises a holder base 124 serving as a base, a workpiece holding body 126 rotatably mounted on the holder base 124 by bearings 125, a collar 127 and a nut 128 for retaining the workpiece holding body 126 against dislodgment from the bearings 125, a seal member 129 disposed closely to the bearings 125, an annular member 131 mounted on the holder base 124 for supporting the bearings 125, an actuator 132 mounted on the holder base 124 for rotating the workpiece holding body 126, a drive gear 133 mounted on the actuator 132 for transmitting drive power, a driven gear 134 mounted on the workpiece holding body 126 near its proximal end, for obtaining drive power from the drive gear 133, a seal member 135 disposed on the proximal end of the workpiece holding body 126, a workpiece indexing mechanism 140 for positioning the workpiece holding body 126 at each of predetermined angles, and a pressure difference generating mechanism 150 for generating a pressure difference between the outside and inside of the fuel injection nozzle 3 as a workpiece. The reference numeral 148 denotes a positioning pin which serves to prevent the fuel injection nozzle 3 from rotating with respect to the workpiece holding body 126 when the workpiece holding body 126 supports the fuel injection nozzle 3. The reference numeral 149 denotes a sealing member for blocking the flow of gases in a gap between the fuel injection nozzle 3 and the workpiece holding body 126.

The workpiece holding body 126 has a passage 136 defined therein which communicates with a passage 118 in the fuel injection nozzle 3. The passage 136 communicates with a space 137 defined in the holder base 124.

The passages 118, 136 and the space 137 jointly make up a plume suction passage 138 for drawing a plume that is generated during a laser machining process.

The workpiece indexing mechanism 140 has a plurality of recesses 142 defined in an outer circumferential surface of a large-diameter portion 141 of the workpiece holding body 126 and spaced at given angular intervals along the circumferential direction, a case 143 mounted on the holder base 124 in confronting relation to the outer circumferential surface of the large-diameter portion 141, a ball 144 disposed in the case 143 for fitting engagement with one at a time of the recesses 142, and a compression spring 145 disposed in the case 143 for pressing the ball 78 into one at a time of the recesses 142.

The distance by which adjacent two of the recesses 142 are spaced from each other corresponds to the distance by which adjacent two of injection holes 6 of the fuel injection nozzle 3 are spaced from each other.

The pressure difference generating mechanism 150 comprises a closing member 151 mounted on the holder base 124 and enclosing the fuel injection nozzle 3, a seal member 153 disposed on an end of the closing member 151 for blocking gas leakages, a transmissive plate 155 for transmitting a laser beam 154 applied from the machining head 122 into a high-pressure chamber 152, a high-pressure gas supply source 156 for introducing a high-pressure gas into the high-pressure chamber 152 to make the pressure in the high-pressure chamber 152 higher than the atmospheric pressure, a gas passage 157 connected to the high-pressure chamber 152 for guiding the gas drawn from the high-pressure chamber 152, a suction passage 158 connected to the plume suction passage 138 for guiding a gas drawn from the plume suction passage 138, a three-way valve 161 for switching to the gas passage 157 or the suction passage 158 as a passage from which a gas is drawn, a solenoid 162 for actuating the three-way valve 161 to switch, and a vacuum pump 163 for drawing the gas from the high-pressure chamber 152 or the plume suction passage 138.

The high-pressure gas supply source 156 should preferably comprise a compressor if the gas is air, or a gas container if the gas is nitrogen.

Since the nitrogen gas is a nonoxidizing gas, it is preferable as it prevents a metal, i.e., the material of which the fuel injection nozzle 3 is made, from being oxidized. However, the gas container is generally expensive and hence is disadvantageous from the standpoint of cost.

On the other hand, air is economical and easy to handle, and hence is practical. Therefore, air will be illustrated as the gas hereinbelow.

A laser machining method according to the second embodiment which is carried out by the laser machining apparatus 120 thus constructed will be described below.

FIGS. 7A and 7B are diagrams illustrative of a process of forming a pilot hole through a fuel injection nozzle. As shown in FIG. 7A, while the atmospheric pressure or a slightly higher pressure is being maintained in the high-pressure chamber 152, the machining head 122 emits and applies the laser beam 154 to the tip end of the fuel injection nozzle 3. When the tip end of the fuel injection nozzle 3 is machined by the laser beam, it produces a plume 165.

Since air remains trapped in the high-pressure chamber 152 until a pilot hole 166 is formed through the tip end of the fuel injection nozzle 3, the transmissive plate 155 or the enclosing member is liable to be damaged if the high-pressure chamber 152 is excessively pressurized. Furthermore, if the high-pressure chamber 152 is excessively pressurized, then the laser machining process tends to slow down. In other words, since air presses the plume 165 to stay stagnant, the plume 165 is not removed from the location to be machined, and blocks the laser beam 154. Stated otherwise, the laser machining process makes program easily if the high-pressure chamber 152 is not excessively pressurized.

Consequently, while the high-pressure gas supply source 156 is introducing air into the high-pressure chamber 152, the vacuum pump 163 draws air from the high-pressure chamber 152. In this manner, all the above shortcomings are avoided.

As the laser machining process using the laser beam 154 progresses, the pilot hole 166 is formed through the fuel injection nozzle 3 as shown in FIG. 7B. At the time the pilot hole 166 is formed through the fuel injection nozzle 3, the high-pressure gas supply source 156 pressurizes the high-pressure chamber 152 (the laser beam entrance side=the inlet side of the pilot hole 166) to a level higher than the atmospheric pressure, and the three-way valve 161 (see FIG. 6) is actuated to cause the vacuum pump 163 to depressurize the passage 118 (the laser beam exit side=the outlet side of the pilot hole 166) to a level lower than the atmospheric pressure. Therefore, a pressure difference is developed between the inlet and outlet sides of the pilot hole 166, allowing air to flow through the pilot hole 166 as indicated by the arrows (1). The plume 165 is now forced to flow into the passage 118. The injection hole 6 to be formed is represented by the two dot and dash dot-and-dash lines.

Figure 8:
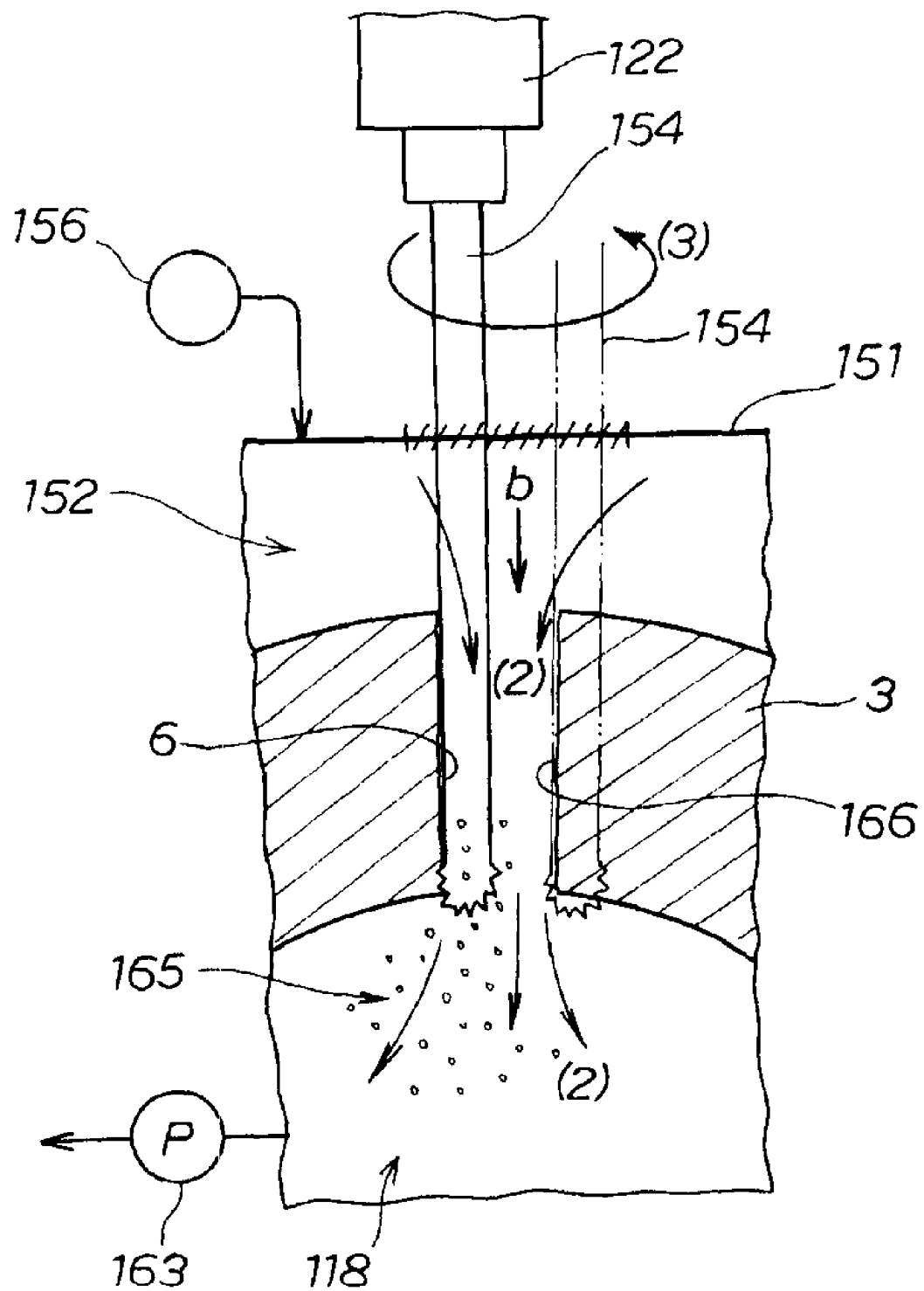
FIG. 8 is a flow diagram illustrative of a process of enlarging the pilot hole.
Figure 9:
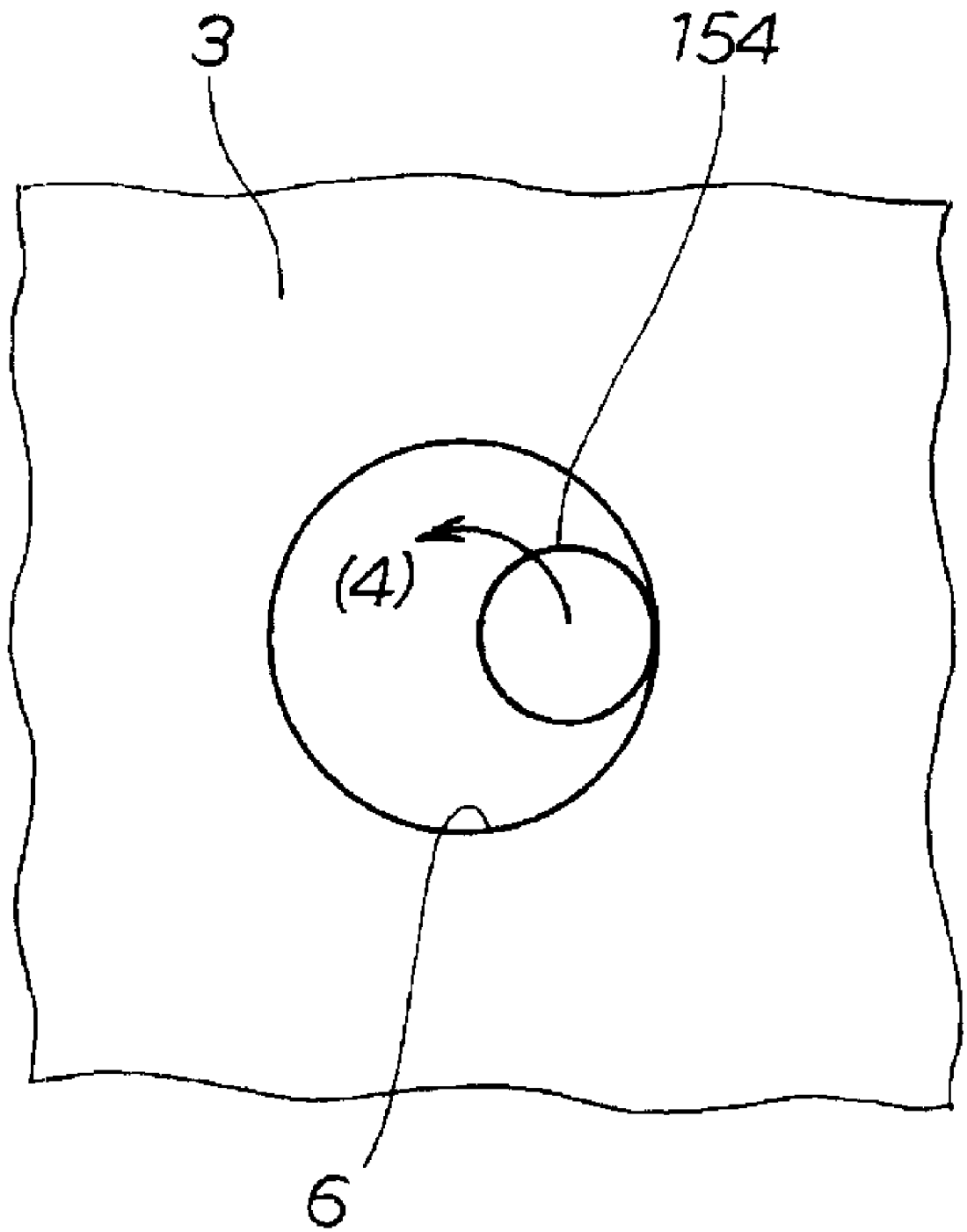
FIG. 9 is a view as seen from the direction indicated by the arrow b in FIG. 8.
Figure 13:
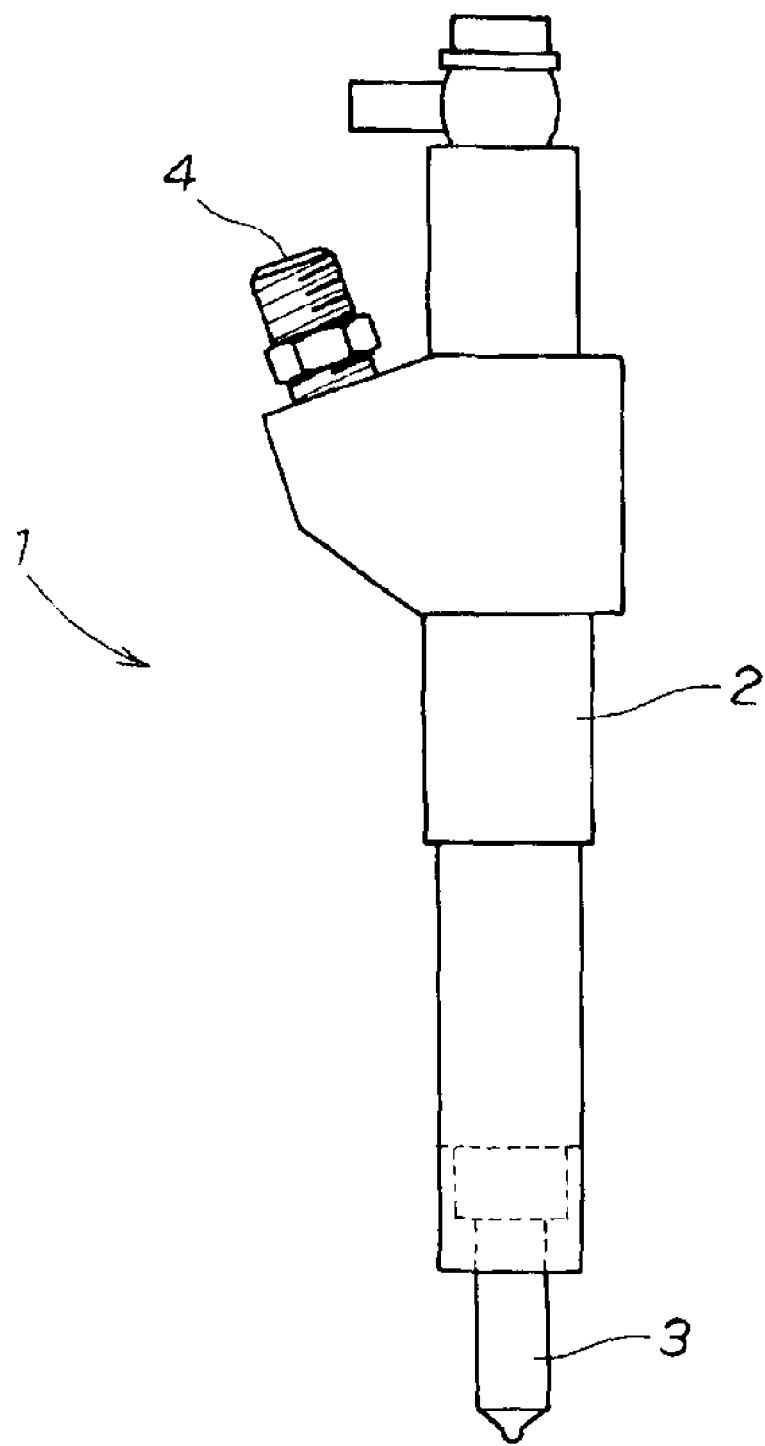
FIG. 13 is a schematic front elevational view of a fuel injection valve, in its entirety, for use on an automobile.
Figure 14:
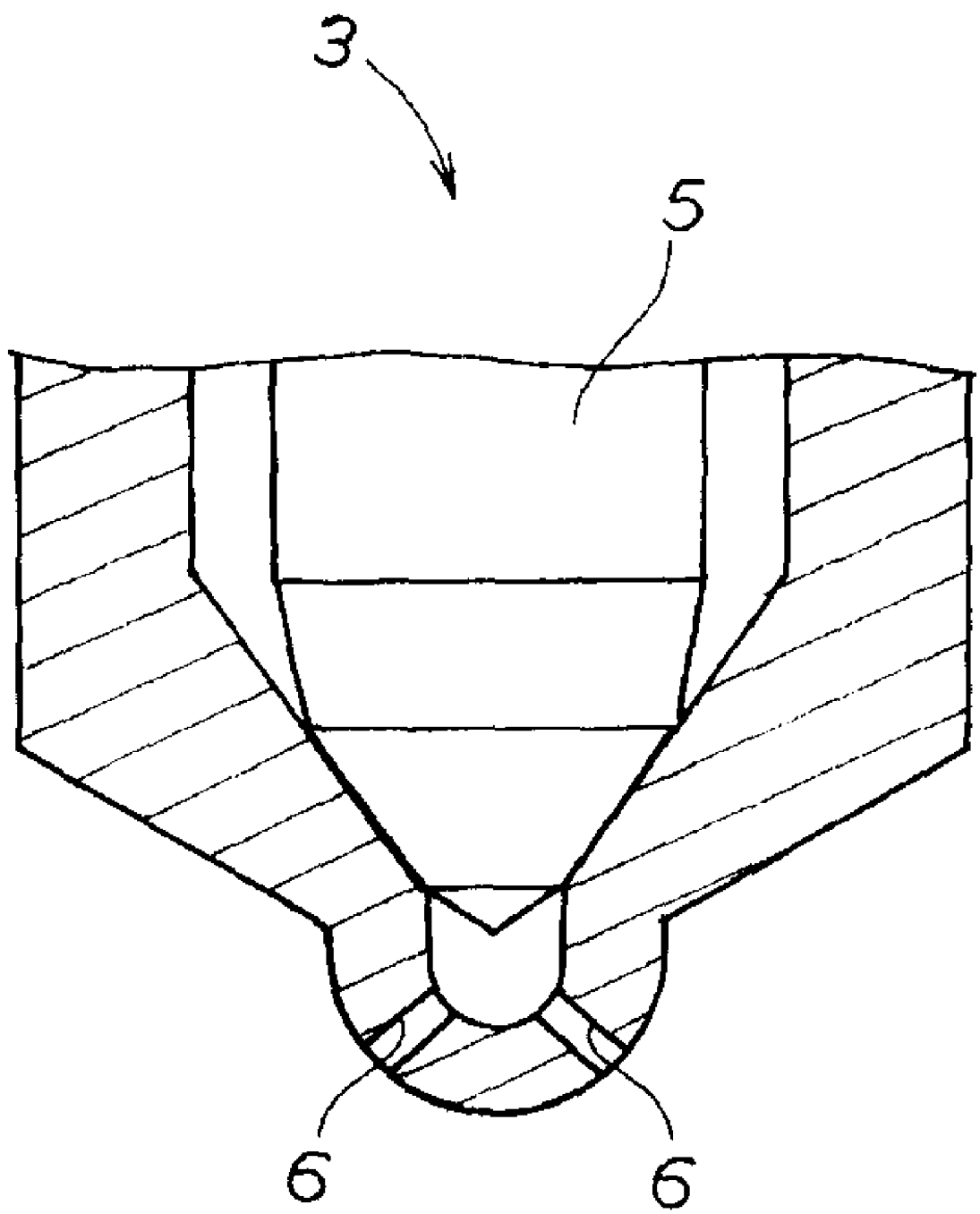
FIG. 14 is a schematic fragmentary vertical cross-sectional view of a tip end of the fuel injection valve.
Figure 15:
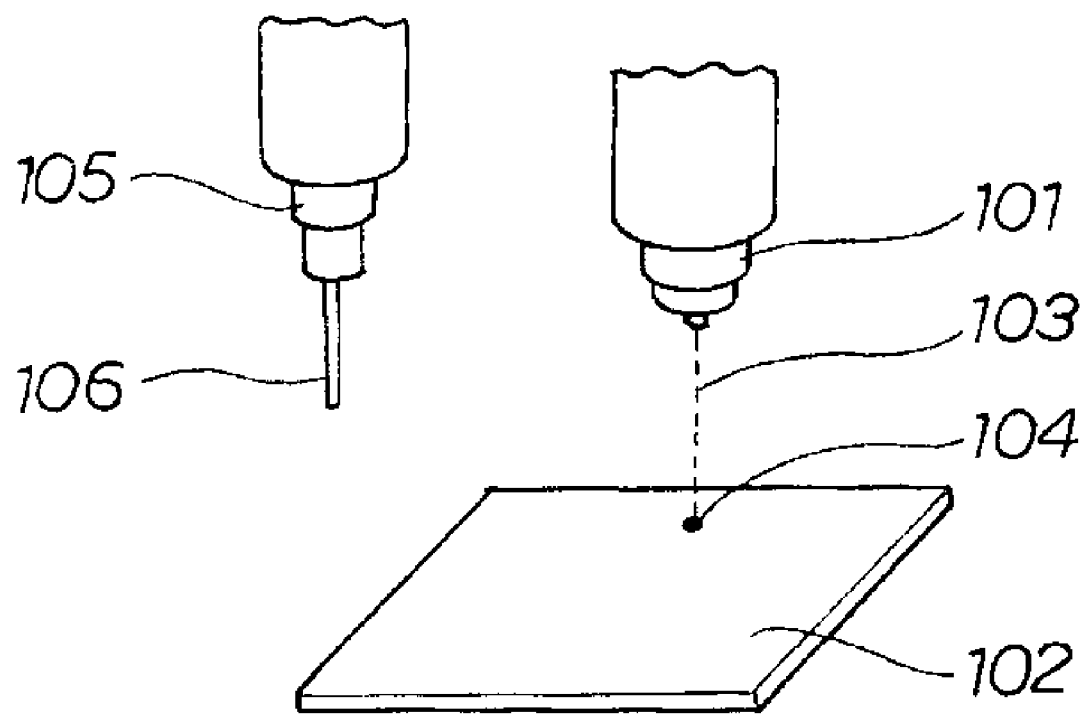
FIG. 15 is a schematic fragmentary perspective view showing the manner in which a pilot hole is defined through a workpiece according to the prior art.
Figure 16:
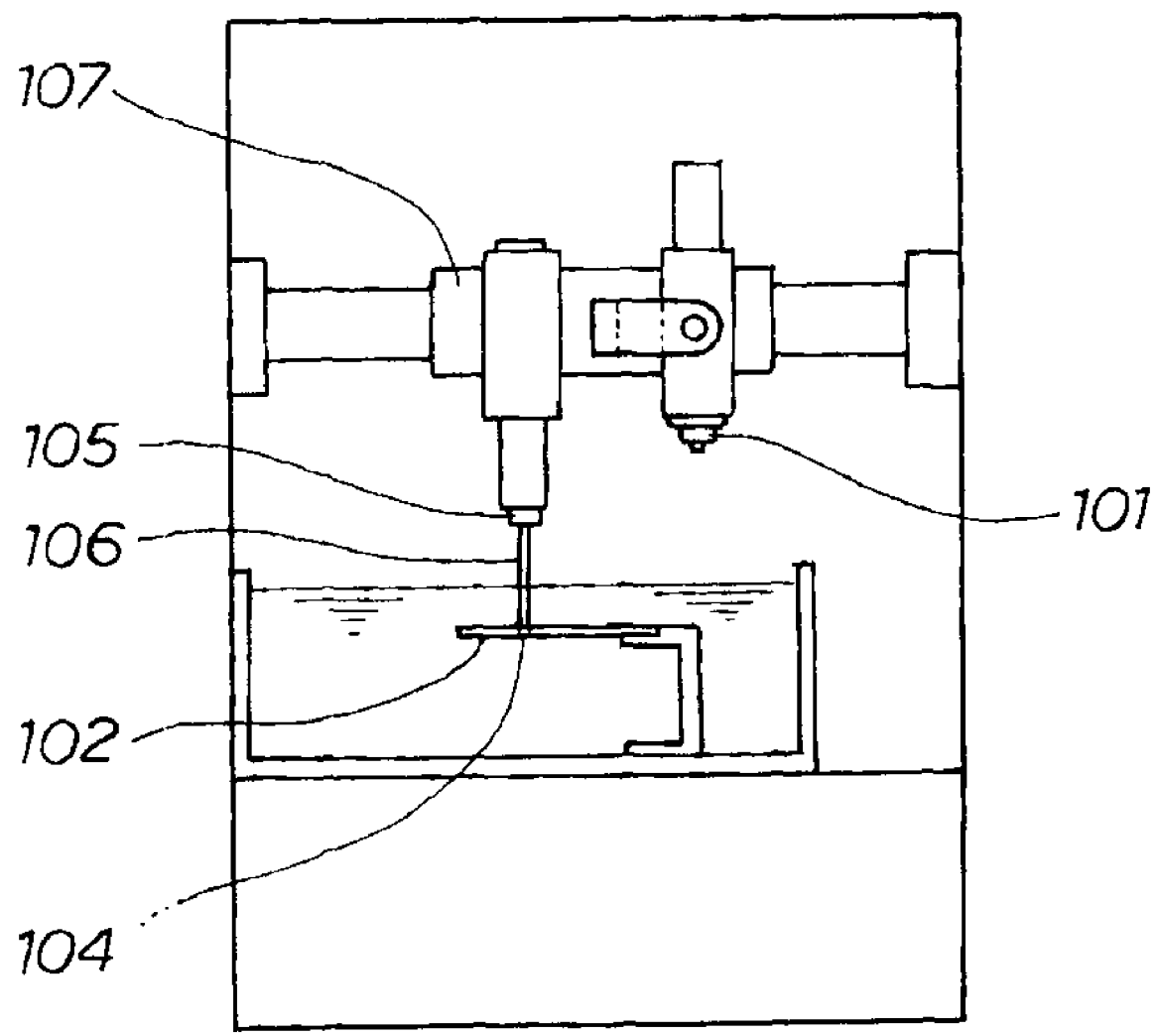
FIG. 16 is a schematic fragmentary perspective view showing the manner in which the pilot hole is enlarged according to the prior art.

FIGS. 8 and 9 are flow diagrams illustrative of a process of enlarging the pilot hole. As shown in FIG. 8, while the above pressure difference is being maintained, the laser beam 154 is applied to enlarge the pilot hole 166 to finish the same. Under the pressure difference, air flows as indicated by the arrows (2), pushing the plume 165 to flow into the passage 118. Therefore, the plume 165 is prevented from blocking the application of the laser beam 154, and hence the irradiation efficiency of the laser beam 154 is not lowered.

As indicated by the arrow (3), the laser beam 154 is rotated to enlarge the pilot hole 166 with the laser beam 154 indicated by the imaginary lines, thereby completing the finishing process on the injection hole 6.

FIG. 9 is a view as seen from the direction indicated by the arrow b in FIG. 8. The laser beam 154 is rotated at a high speed as indicated by the arrow (4) to increase the area in which the laser beam 154 is applied to the fuel injection nozzle 3 per unit time. Thus, a high-speed laser machining process is performed.

FIGS. 10A and 10B are schematic views showing how the laser machining process according to the second embodiment works based on a comparison between inventive and comparative examples. In the inventive example shown in FIG. 10A, the plume 165 is discharged from within the injection hole 6 as indicated by the arrows (5) on an air stream due to the pressure difference. As a result, the injection hole 6 can be machined in a short period of time because the irradiation efficiency of the laser beam 154 is not lowered.

In the comparative example shown in FIG. 10B, since there is no pressure difference, no air stream is produced. When the fuel injection nozzle 3 is machined by the laser beam 154, the plume 165 stays stagnant in the injection hole 6. As a result, the irradiation efficiency of the laser beam 154 is lowered. Furthermore, since molten metal masses 167 are deposited, the machining time is increased.

FIGS. 11A and 11B are cross-sectional views of a machined hole, showing how an air stream affects the machining process. The laser beam used in the enlarging process had conditions including a frequency of 3 kHz, an energy of 2 mJ, a laser beam rotational speed of 3000 rpm, and a machining time of 30 seconds.

FIG. 11A shows a comparative example in which the machined surface is rough because of a molten metal mass deposited in the injection hole 6. The injection hole 6 has a diameter of 63 μm at an upper opening as shown and a diameter of 33 μm at a lower opening as shown. Therefore, the diameter of the injection hole 6 is not uniform. In addition, the machined volume is 947 $\mu m^3$ and hence is small.

FIG. 11B shows an inventive example in which the machined surface is fine because no molten metal mass is deposited in the injection hole 6 due to an air stream. The injection hole 6 has a diameter of 76 μm at an upper opening as shown and a diameter of 63 μm at a lower opening as shown. Therefore, the diameter of the injection hole 6 is substantially uniform. In addition, the machined volume is 1930 $\mu m^3$ and hence is large.

FIG. 12 is a diagram showing different machining times depending on whether there is a pressure difference or not. According to a comparative example in which the fuel injection nozzle is machined with no pressure difference, it takes 1 second until the through hole is machined and 60 seconds until the finishing process is finished.

According to an inventive example in which the fuel injection nozzle is machined with a pressure difference, it takes 1 second until the through hole is machined and 30 seconds until the finishing process is finished. Therefore, the man-hours required for the machining process are reduced to one-half.

In the second embodiment, the workpiece is not limited to the fuel injection nozzle 3 in particular, either.

INDUSTRIAL APPLICABILITY

The laser machining apparatus and the laser machining method according to the present invention are particularly effective in forming an injection hole in a fuel injection nozzle of a fuel injection valve.

The invention claimed is:

1. A laser machining apparatus for forming a through hole in a closed region of a hollow workpiece of metal by applying at least either one of a nanosecond laser beam and a picosecond laser beam thereto, comprising:
   a laser machining head having a first laser oscillating mechanism for applying the nanosecond laser beam and a second laser oscillating mechanism for applying the picosecond laser beam;
   a holding mechanism for holding the workpiece of metal;
   a vapor removing mechanism for drawing a metal vapor which is produced from the workpiece of metal when the through hole is formed therein; and
   control means for controlling activation and inactivation of the laser machining head, the holding mechanism, and the vapor removing mechanism;
   wherein the vapor removing mechanism has gas supply means for supplying a gas after the through hole is formed.

2. A laser machining apparatus according to claim 1, wherein the vapor removing mechanism has suction means for drawing the metal vapor from inside the workpiece of metal.

3. A laser machining apparatus according to claim 1, wherein the holding mechanism comprises a rotating and holding mechanism for rotating the workpiece of metal about the region thereof to which at least either one of the nanosecond laser beam and the picosecond laser beam is applied.

4. A laser machining method for forming a through hole in a closed region of a hollow workpiece of metal by applying at least either one of a nanosecond laser beam and a picosecond laser beam thereto, comprising the steps of:
   forming the through hole by applying the nanosecond laser beam from a first laser oscillating mechanism to the workpiece of metal which is held by a holding mechanism; and
   finishing the through hole by applying the picosecond laser beam from a second laser oscillating mechanism to an inner wall of the through hole in the workpiece of metal which is being held by the holding mechanism;
   wherein a metal vapor is drawn from outside the workpiece of metal during the step of forming the through hole; and
   a gas is supplied from outside the workpiece of metal and drawn from inside the workpiece of metal, after the step of forming the through hole.

5. A laser machining method according to claim 4, wherein the holding mechanism comprises a rotating and holding mechanism, and in the step of finishing, the inner wall of the through hole is finished while the workpiece of metal is being rotated by the rotating and holding mechanism.

6. A laser machining method for forming a through hole in a workpiece, comprising the steps of:
   applying a laser beam to the workpiece to form a pilot hole therethrough; and
   enlarging the pilot hole with the laser beam while keeping a pressure on a laser exit side of the pilot hole lower than a pressure on a laser entrance side of the pilot hole.

7. A laser machining method according to claim 6, wherein an optical axis of the laser beam is rotated about an axis of the pilot hole in the step of enlarging the pilot hole with the laser beam.

* * * * *